US009291874B2

(12) United States Patent
Fujinoki

(10) Patent No.: US 9,291,874 B2
(45) Date of Patent: Mar. 22, 2016

(54) OPTICAL DEFLECTION ELEMENT AND OPTICAL DEFLECTION DEVICE

(71) Applicant: Panasonic Corporation, Osaka (JP)

(72) Inventor: Norihito Fujinoki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/389,557

(22) PCT Filed: Jan. 28, 2014

(86) PCT No.: PCT/JP2014/000432
§ 371 (c)(1),
(2) Date: Sep. 30, 2014

(87) PCT Pub. No.: WO2014/122896
PCT Pub. Date: Aug. 14, 2014

(65) Prior Publication Data
US 2015/0049979 A1    Feb. 19, 2015

(30) Foreign Application Priority Data
Feb. 6, 2013  (JP) ................................. 2013-021083

(51) Int. Cl.
G02F 1/295 (2006.01)
G02F 1/313 (2006.01)
G02F 1/29 (2006.01)
G02B 6/10 (2006.01)
G02B 6/00 (2006.01)

(52) U.S. Cl.
CPC  *G02F 1/313* (2013.01); *G02B 6/10* (2013.01); *G02F 1/29* (2013.01); *G02B 2006/0098* (2013.01); *G02F 1/295* (2013.01); *G02F 2001/291* (2013.01); *G02F 2201/122* (2013.01)

(58) Field of Classification Search
CPC ......... G02F 1/225; G02F 1/025; G02F 1/035; G02F 1/2255; G02F 1/295

USPC .............................................. 385/1, 2, 4, 8, 9
See application file for complete search history.

(56) References Cited

U.S. PATENT DOCUMENTS 6,282,357 B1 * 8/2001 Kadota .................. G02F 1/335
257/134
6,767,749 B2 * 7/2004 Kub .................. H01L 21/76254
257/E21.568

(Continued)

FOREIGN PATENT DOCUMENTS

JP   53-101929   9/1978
JP   63-182609   7/1988

(Continued)

OTHER PUBLICATIONS

International Search Report issued Mar. 25, 2014 in International (PCT) Application No. PCT/JP2014/000432.

(Continued)

*Primary Examiner* — Jennifer Doan
(74) *Attorney, Agent, or Firm* — Wenderoth, Lind & Ponack, L.L.P.

(57) ABSTRACT

An optical deflection element is provided with a substrate; an optical waveguide film made of an electro-optic medium, and constituting an optical waveguide formed on the substrate; a first electrode pair disposed on an incident side of the optical waveguide film at a position facing a film thickness direction of the optical waveguide film, and configured to deflect a light beam transmitting through the optical waveguide film in an in-plane direction of the optical waveguide film in accordance with a first applied voltage; and a second electrode pair disposed on an output side of the optical waveguide film at a position facing the film thickness direction of the optical waveguide film, and configured to deflect the light beam deflected in the in-plane direction of the optical waveguide film by the first electrode pair in the film thickness direction of the optical waveguide film in accordance with a second applied voltage. The second electrode pair includes a first electrode and a second electrode. The first electrode and the second electrode are formed to have lengths different from each other in a direction of travel of the light beam transmitting through the optical waveguide film.

17 Claims, 9 Drawing Sheets

(56) References Cited

U.S. PATENT DOCUMENTS

| | | |
|---|---|---|
| 2009/0015904 A1 | 1/2009 | Okayama |
| 2009/0219378 A1 | 9/2009 | Nakamura et al. |
| 2010/0253996 A1 | 10/2010 | Nakamura et al. |
| 2012/0063715 A1 | 3/2012 | Nakagawa et al. |
| 2012/0182600 A1 | 7/2012 | Nakamura et al. |

FOREIGN PATENT DOCUMENTS

| | | |
|---|---|---|
| JP | 4-16830 | 1/1992 |
| JP | 2009-20442 | 1/2009 |
| JP | 2012-58651 | 3/2012 |
| JP | 2012-155045 | 8/2012 |
| WO | 2006-137408 | 12/2006 |

OTHER PUBLICATIONS

K. Nakamura et al., "Wide-angle low-voltage electro-optic beam deflection based on space-charge-controlled mode of electrical conduction in $K Ta_{1-x} Nb_x O_3$", Applied Physics Letters 89, 131115 (2006).

\* cited by examiner

OPTICAL DEFLECTION ELEMENT AND OPTICAL DEFLECTION DEVICE

TECHNICAL FIELD

The present invention relates to an optical deflection element and an optical deflection device, and more particularly to an optical deflection element and an optical deflection device that enable to two-dimensionally deflect a light beam incident into an optical waveguide by an electro-optic effect. The optical deflection element is applicable to the whole range of optical devices including a laser printer, a projector, a laser scanning microscope, an optical diagnostic device using optical coherence tomography, and a switching element for optical communication.

BACKGROUND ART

An optical deflection element capable of scanning a light beam at an intended angle in accordance with an input signal is a fundamental element used for a variety of purposes in configuring, for instance, a laser printer, a video device such as a projector and a display, a laser scanning microscope, an optical head using optical recording, an optical diagnostic device using optical coherence tomography, a switching element for optical communication, and various sensing devices. The optical deflection element is roughly classified into mechanical deflection elements such as a vibration galvanometer, a polygon mirror, and an MEMS (Micro Electro Mechanical Systems) mirror; and non-mechanical optical deflection elements such as an acoustic-optic element and an electro-optic element.

It is difficult to miniaturize the mechanical deflection element having a mechanism for driving a mirror. High-speed scanning cannot be expected, because the mechanical deflection element requires large electric power consumption, and a mirror is used. It is possible to perform high-speed scanning by the acoustic-optic element, as compared with the mechanical deflection element. However, the acoustic-optic element includes an ultrasonic wave generation part utilizing an acoustic-optic effect. Therefore, it is difficult to miniaturize the element. Further, the drive system may be complicated and over-sized, because an elastic wave excitation signal of several hundred MHz is required.

On the other hand, in contrast to the acoustic-optic element utilizing an acoustic-optic effect, there is proposed, as an element capable of deflecting light at a high speed, an optical deflection element using an electro-optic medium (hereinafter, also referred to as "electro-optic crystal") having an electro-optic effect (EO (Electro-Optic) effect). The performances required in the electro-optic element are capability of scanning in a wide angle, capability of scanning at a high speed, low electric power consumption or operability in response to an input signal indicating low voltage, smallness, and excellent impact resistance.

The optical deflection element using an electro-optic element controls the direction of travel of light, with use of an electro-optic effect such that the refractive index of a material changes by application of an electric field to the material. In the following, a representative conventional art using an electro-optic element is described.

There is known an electro-optic element obtained by forming a prism-shaped electrode on a surface of electro-optic crystal such as crystal of lithium niobate ($LiNbO_3$:LN), potassium niobate ($KNbO_3$), or potassium tantalate niobate ($KTa_{1-x}Nb_xO_3$:KTN) or by patterning a polarization inversion region such as a prism shape on electro-optic crystal. In the electro-optic element, the refractive index changes and light is deflected by applying a voltage to the electrode or to the polarization inversion region.

For instance, in patent literature 1, as illustrated in FIG. 12, a prism-shaped polarization inversion region 102 is formed on an optical waveguide layer 101 made of magnesium-oxide-doped lithium niobate and an upper electrode layer and a lower electrode layer are formed on the upper surface and the lower surface of the optical waveguide layer 101. Light deflection in a horizontal direction (xy-plane direction in FIG. 12) to the surface of the optical waveguide layer 101 is performed by applying a voltage to the upper electrode and the lower electrode.

Next, in non-patent literature 1, there is reported an optical deflection element utilizing space-charge-controlled electrical conduction, as a kind of electro-optic elements. The optical deflection effect utilizes a phenomenon, in which the refractive index change by an electro-optic element is inclined by introduction of electrons into electro-optic crystal, and wide-angle optical deflection is performed. Specifically, as illustrated in FIG. 13, optical deflection with respect to the film thickness direction (z-axis direction in FIG. 13) of a KTN crystal substrate 103 is performed by forming a metal electrode 104 on the upper surface and the lower surface of the KTN crystal substrate 103 having a large electro-optic effect, and by applying a voltage to the metal electrodes 104.

Patent literature 2 also reports an optical deflection element utilizing a space-charge-controlled electrical conduction. As illustrated in FIG. 14, the optical deflection element is configured such that two-dimensional optical deflection is performed with respect to the film thickness direction (z-axis direction in FIG. 14) of an electro-optic medium 105, and with respect to a horizontal direction (xy-plane direction in FIG. 14) to the surface of the electro-optic medium 105 by forming electrodes 106 on the upper surface and the lower surface (surfaces in parallel to xy-plane in FIG. 14) of the electro-optic medium 105, forming electrodes 107 on side surfaces (surfaces in parallel to yz-plane in FIG. 14) perpendicular to the electrodes 106, and applying a voltage between the electrodes 106 and between the electrodes 107.

Patent literature 3 also reports an optical deflection element utilizing space-charge-controlled electrical conduction. The optical deflection element is configured such that two-dimensional optical deflection is performed by growing crystal of an electro-optic medium in a solution to generate electro-optic crystal, forming electrodes on the electro-optic crystal, and applying a voltage to the electrodes.

None of the aforementioned conventional arts, however, succeeded in realizing a small-sized optical deflection element capable of two-dimensionally deflecting a light beam at a low drive voltage and at a high speed with use of one substrate.

CITATION LIST

Patent Literature

Patent literature 1: Japanese Unexamined Patent Publication No. 2012-58651
Patent literature 2: Japanese Unexamined Patent Publication No. 2009-20442
Patent literature 3: International Unexamined Patent Publication No. 2006/137408

Non-Patent Literature

Non-patent literature 1: K. Nakamura et al. "Wide-angle low-voltage electro-optic beam deflection based on spacecharge-controlled mode of electrical condition in KTa1-xNbxO3" Applied Phys. Lett. 89, 131115 (2006)

SUMMARY OF INVENTION

In view of the above, an object of the invention is to provide a small-sized optical deflection element that enables to two-dimensionally deflect a light beam at a low drive voltage and at a high speed with use of one substrate.

An optical deflection element according to an aspect of the invention is provided with a substrate; an optical waveguide film made of an electro-optic medium, and constituting an optical waveguide formed on the substrate; a first electrode pair disposed on an incident side of the optical waveguide film at a position facing a film thickness direction of the optical waveguide film, and configured to deflect a light beam transmitting through the optical waveguide film in an in-plane direction of the optical waveguide film in accordance with a first applied voltage; and a second electrode pair disposed on an output side of the optical waveguide film at a position facing the film thickness direction of the optical waveguide film, and configured to deflect the light beam deflected in the in-plane direction of the optical waveguide film by the first electrode pair in the film thickness direction of the optical waveguide film in accordance with a second applied voltage. The second electrode pair includes a first electrode and a second electrode. The first electrode and the second electrode are formed to have lengths different from each other in a direction of travel of the light beam transmitting through the optical waveguide film.

According to the above configuration, it is possible to realize a small-sized optical deflection element that enables to two-dimensionally deflect a light beam at a low drive voltage and at a high speed with use of one substrate.

DESCRIPTION OF EMBODIMENTS

In the following, the invention is described in details using the embodiments. The invention, however, is not limited by the embodiments.

(Preface to Aspect of Invention)

1. One-dimensional Optical Deflection Technology

Figure 12:
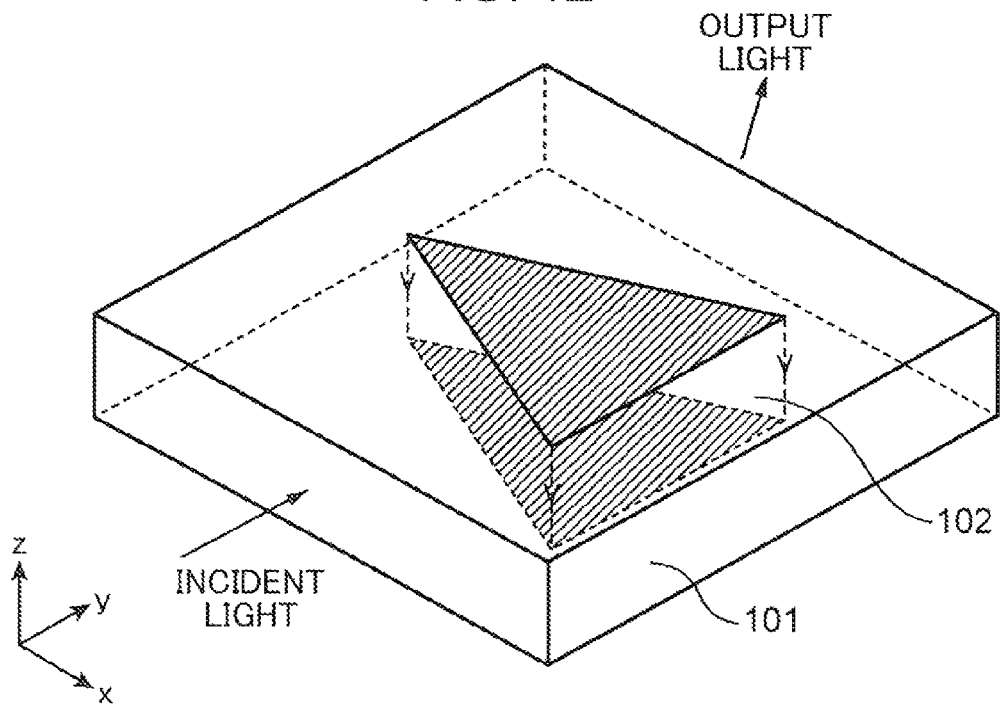
FIG. 12 is a perspective view illustrating a conventional optical deflection element using electro-optic crystal.

In patent literature 1, optical deflection in a horizontal direction (xy-plane direction in FIG. 12) to the surface of the optical waveguide layer 101 is performed by providing a pair of electrodes. Patent literature 1, however, merely used a pair of electrodes. Accordingly, patent literature 1 fails to provide two-dimensional optical deflection. Specifically, whereas light is deflected in a horizontal direction to the surface of the optical waveguide layer 101, it is impossible to deflect light in a direction perpendicular to the surface of the optical waveguide layer 101.

Figure 13:
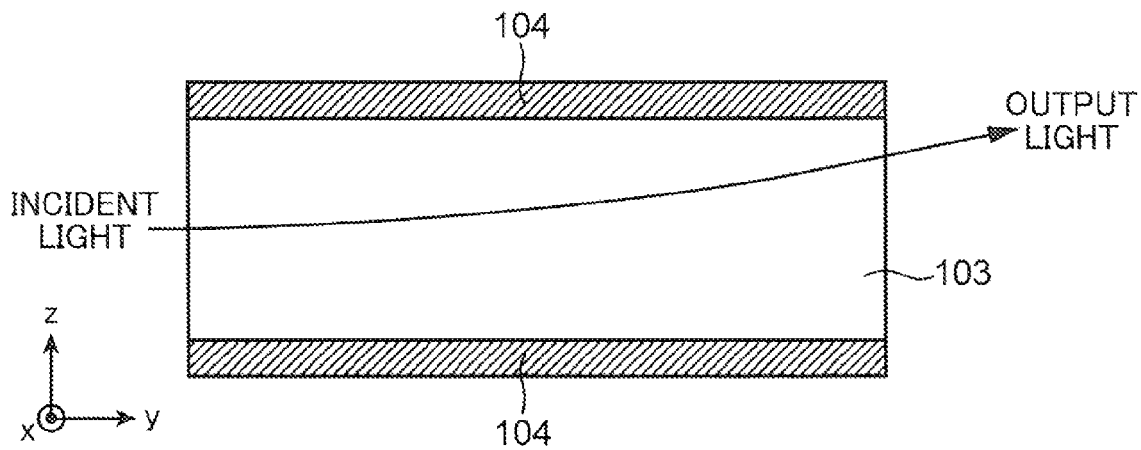
FIG. 13 is a main part cross-sectional view illustrating an operation of one-dimensional optical deflection by a conventional optical deflection element using space-charge-controlled electrical conduction of electro-optic crystal.

Further, in non-patent literature 1, optical deflection in the film thickness direction (z-axis direction in FIG. 13) of the KTN crystal substrate 103 is performed by providing the metal electrode pair 104. However, non-patent literature 1 merely uses the metal electrode pair 104. Accordingly, non-patent literature 1 also fails to perform two-dimensional optical deflection. Specifically, whereas light is deflected in a direction perpendicular to the surface of the KTN crystal substrate 103, it is impossible to deflect light in a horizontal direction to the surface of the KTN crystal substrate 103.

As described above, the deflection direction of light is limited to one-dimensional direction horizontal or vertical to the surface of the substrate of electro-optic crystal provided with electrodes. The deflection angle of light is small because the deflection direction of light is limited to one-dimensional direction.

Further, in non-patent literature 1, the optical deflection element utilizes space-charge-controlled electrical conduction of electro-optic crystal. Accordingly, it is necessary to secure a large film thickness (e.g. 1 mm or larger) of electro-optic crystal in order to obtain a large deflection angle. This results in an increase in the drive voltage. Specifically, generally, when an optical deflection element utilizing an electro-optic effect is used, the film thickness of the optical deflection element is about several hundred micrometers. However, as compared with the above configuration, it is impossible to reduce the thickness of electro-optic crystal in an optical deflection element utilizing space-charge-controlled electrical conduction. Therefore, it is impossible to lower the drive voltage.

2. Two-dimensional Optical Deflection Technology

In patent literature 2, two-dimensional optical deflection is performed with respect to the film thickness direction (z-axis direction in FIG. 14) of the electro-optic medium 105, and with respect to the horizontal direction (xy-plane direction in FIG. 14) to the surface of the electro-optic medium 105.

Figure 14:
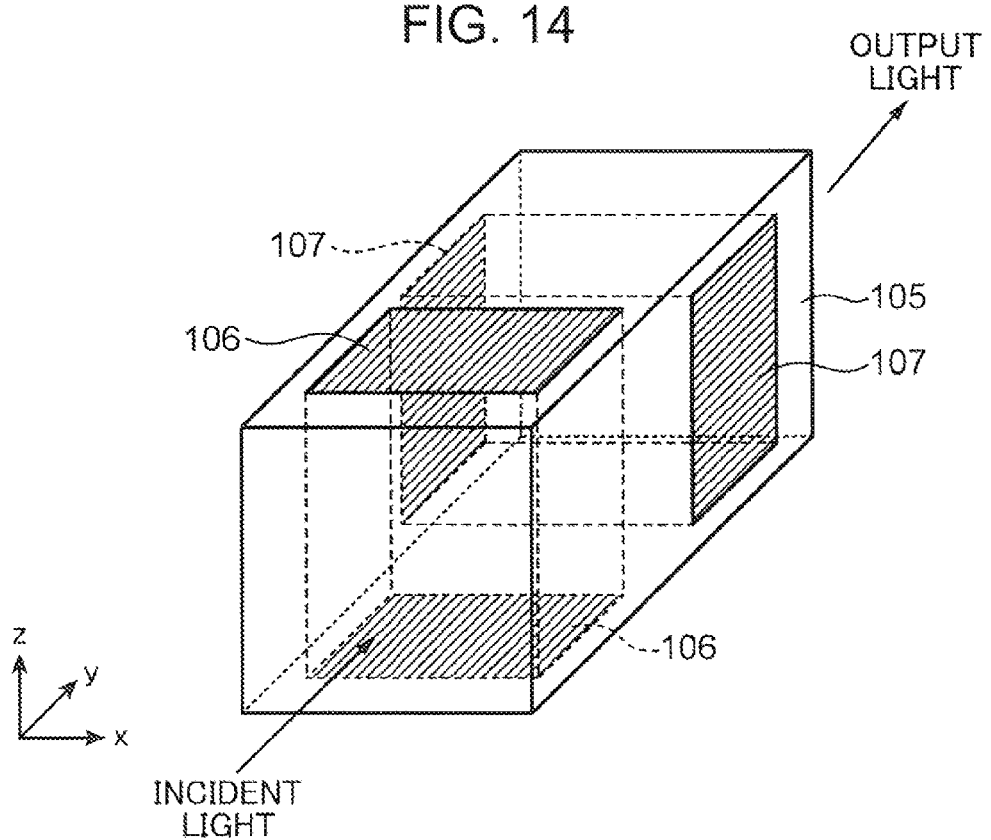
FIG. 14 is a perspective view illustrating an operation of two-dimensional optical deflection by a conventional optical deflection element using space-charge-controlled electrical conduction of electro-optic crystal.

However, attempting to realize the optical deflection element as illustrated in FIG. 14 results in an increase in the size of the element. The drive voltage increases, as the size of the element increases, which is not practical.

Specifically, reducing the thickness of the electro-optic medium 105 makes it possible to lower the applied voltage between the electrodes 106. This makes it possible to drive at a low voltage. However, as the thickness of the electro-optic medium 105 is reduced, the surface area of the electrode 107 formed on a side surface (a surface in parallel to yz-plane in FIG. 14) of the thin electro-optic medium 105 is reduced. Consequently, it is impossible to obtain a sufficient prism area in order to obtain an intended deflection angle. Further, if a sufficient prism area is attempted to secure in order to obtain an intended deflection angle between the electrodes 106 and between the electrodes 107, the thickness of the electro-optic medium 105 is increased, as illustrated in FIG. 14. This may increase the applied voltage.

Further, in patent literature 2, the electro-optic medium 105 functions as an optical deflector configured to linearly change a refractive index distribution in the depth direction by an electric filed generated by application of a voltage. Specifically, the technology disclosed in patent literature 2 is directed to an optical deflection element utilizing space-charge-controlled electrical conduction, as well as non-patent literature 1. It is necessary to increase the film thickness (to set the film thickness to be e.g. 1 mm or larger) of electro-optic crystal in order to obtain a large deflection angle in an optical deflection element utilizing space-charge-controlled electrical conduction such that the refractive index distribution linearly changes in the depth direction. This may increase the drive voltage.

Specifically, generally, when an optical deflection element utilizing an electro-optic effect is used, the film thickness of the optical deflection element is about several hundred micrometers. As compared with the above configuration, it is impossible to reduce the thickness of the electro-optic medium in the optical deflection element disclosed in patent literature 2. Accordingly, in patent literature 2, it is impossible to reduce the drive voltage.

Further, in the optical deflection element as disclosed in patent literature 2, it is necessary to manufacture the electrode pair 107 on the side surfaces (surfaces in parallel to yz-plane in FIG. 14) of the electro-optic medium 105 in the film thickness direction. However, in patent literature 2, electro-optic crystal is generated by growing crystal of an electro-optic medium in a solution. Accordingly, it is necessary to cut out the rectangular parallelepiped electro-optic medium 105 from the electro-optic crystal in forming an electro-optic element. It is possible to cut out the electro-optic medium 105 in parallel to the paired surfaces of the electro-optic medium 105 (e.g. surfaces in parallel to xy-plane in FIG. 14). However, it is difficult to cut out the electro-optic medium along a side surface (a surface in parallel to yz-plane in FIG. 14) perpendicular to the paired surfaces. Accordingly, it is difficult to form the electrode pair 107 in parallel to the side surfaces of the electro-optic medium 105, and it is extremely difficult to form the electrode pair 107 in a direction perpendicular to the electrodes 106.

Patent literature 3 also discloses an optical deflection element utilizing space-charge-controlled electrical conduction. In patent literature 3, electro-optic crystal is generated by growing crystal of an electro-optic medium in a solution. As a result of the above operation, the film thickness of the electro-optic crystal is increased to a thickness of about 0.5 mm, for instance. Therefore, a high drive voltage (e.g. 100 V) is required.

Further, the optical deflection element utilizing space-charge-controlled electrical conduction has a drawback such the deflection angle with respect to a drive voltage is small. In the case where the thickness of the electro-optic crystal used in patent literature 3 is set to be e.g. 0.5 mm, and a refractive index change at the drive voltage of 100 V or higher is used as a reference, the refractive index change is reduced to one-fifth or lower at the drive voltage of about 60 V. Specifically, as the drive voltage is lowered, the refractive index change is reduced. This makes it impossible to obtain an intended optical deflection. Thus, it is impossible to obtain an intended deflection angle, unless a certain film thickness is secured. In this case, the object of patent literature 3 of efficiently increasing the deflection angle of a light beam cannot be achieved.

In view of the above, the inventor has achieved one aspect of the invention as described below.

Specifically, an optical deflection element according to an aspect of the invention is provided with a substrate; an optical waveguide film made of an electro-optic medium, and constituting an optical waveguide formed on the substrate; a first electrode pair disposed on an incident side of the optical waveguide film at a position facing a film thickness direction of the optical waveguide film, and configured to deflect a light beam transmitting through the optical waveguide film in an in-plane direction of the optical waveguide film in accordance with a first applied voltage; and a second electrode pair disposed on an output side of the optical waveguide film at a position facing the film thickness direction of the optical waveguide film, and configured to deflect the light beam deflected in the in-plane direction of the optical waveguide film by the first electrode pair in the film thickness direction of the optical waveguide film in accordance with a second applied voltage. The second electrode pair includes a first electrode and a second electrode. The first electrode and the second electrode are formed to have lengths different from each other in a direction of travel of the light beam transmitting through the optical waveguide film.

According to the above aspect, it is possible to dispose the first electrode pair and the second electrode pair to face the film thickness direction of the optical waveguide film constituting the optical waveguide formed on one substrate, and to apply a voltage to the first electrode pair and to the second electrode pair both in the film thickness direction. This makes it possible to reduce the film thickness of the optical waveguide film to thereby reduce the thickness of the optical waveguide.

Further, the first electrode pair for deflecting the light beam in the in-plane direction of the optical waveguide film e.g. in a horizontal direction to the principal plane of the substrate, and the second electrode pair for deflecting the light beam in the film thickness direction of the optical waveguide film e.g. in a direction perpendicular to the principal plane of the substrate are disposed to face the film thickness direction of the optical waveguide film. This makes it possible to miniaturize the optical deflection element and to two-dimensionally deflect the light beam at a high speed.

In the above configuration, the second electrode pair is constituted of a first electrode and a second electrode, and the first electrode and the second electrode are formed to have lengths different from each other in the direction of travel of the light beam transmitting through the optical waveguide film. According to this configuration, the angle of light to be incident on a prism area to be formed between the first electrode and the second electrode is different from the angle of light to be output from the prism area. This makes it possible to increase the deflection angle of light passing through the prism area to be formed by the first electrode and the second electrode. Accordingly, it is possible to obtain a sufficiently large deflection angle even in a configuration, in which the film thickness of the optical waveguide film made of an electro-optic medium is reduced, two electrode pairs i.e. the first electrode pair and the second electrode pair are disposed to face the film thickness direction of the optical waveguide film, and a low drive voltage is applied to the two electrode pairs.

Further, one optical waveguide film is formed on one substrate, and two electrode pairs are formed on the upper surface and the lower surface of the optical waveguide film. This makes it possible to manufacture an optical deflection element with a simplified process and at a low cost.

As a result of the above configuration, it is possible to realize a small-sized optical deflection element capable of two-dimensionally deflecting a light beam at a low drive voltage and at a high speed with use of one substrate. The optical deflection element of the invention is applicable to the whole range of optical devices including a laser printer, a projector, a laser scanning microscope, an optical diagnostic device using optical coherence tomography, and a switching element for optical communication.

Further, in the above aspect, for instance, the optical deflection element according to an aspect of the invention may be configured such that the thickness of the optical waveguide film is not smaller than 1 μm but not larger than 10 μm. In the above configuration, it is possible to transmit the light beam, without setting the waveguide mode to a single mode in the optical waveguide film, and to drive at a low drive voltage.

Further, in the above aspect, for instance, the optical deflection element according to an aspect of the invention may be configured such that the first electrode and the second electrode are metal electrodes. In the above configuration, it is possible to efficiently transmit light in the optical waveguide film.

Further, in the above aspect, for instance, the optical deflection element according to an aspect of the invention may be configured such that the first electrode is disposed on a side of the substrate of the optical waveguide film, the second electrode is disposed on an opposite side of the substrate of the optical waveguide film, and a length of the first electrode in the direction of travel of the light beam transmitting through the optical waveguide film is longer than a length of the second electrode in the direction of travel.

In the above configuration, it is possible to form a prism area having a trapezoidal shape in cross section, in which the bottom side is longer than the upper side, assuming that the side corresponding to the substrate side is the bottom side. Forming the prism area having a trapezoidal shape in cross section as described above makes it possible to deflect light in two stages i.e. in incidence on the prism area to be formed by the second electrode pair and in output from the prism area. This is advantageous in largely bending output light toward an intended direction. Thus, it is possible to largely bend output light at a low drive voltage, even if the film thickness of the optical waveguide film made of an electro-optic medium is small.

On the other hand, unlike the prism area having a trapezoidal shape in cross section, a conventional rectangular parallelepiped optical deflection element changes the optical path only in two stages i.e. in incidence and in output. According to the conventional art, it is required to increase the film thickness of electro-optic crystal in order to largely bend the optical path. In contrast, forming the prism area having a trapezoidal shape in cross section as described in the above aspect makes it possible to stepwise change the optical path of output light. Specifically, different optical paths are provided in three stages i.e. in output from the prism area to be formed by the first electrode pair, in incidence on the prism area to be formed by the second electrode pair, and in output from the prism area to be formed by the second electrode pair. Thus, it is possible to largely bend the optical path of output light.

Further, in the above aspect, for instance, the optical deflection element according to an aspect of the invention may be configured such that the first electrode is disposed on a side of the substrate of the optical waveguide film, the second electrode is disposed on an opposite side of the substrate of the optical waveguide film, and a length of the first electrode in the direction of travel of the light beam transmitting through the optical waveguide film is shorter than a length of the second electrode in the direction of travel.

In the above configuration, it is possible to form a prism area having a trapezoidal shape in cross section, in which the bottom side is shorter than the upper side, assuming that the side corresponding to the substrate side is the bottom side. Forming the prism area having a trapezoidal shape in cross section as described above makes it possible to deflect light in two stages i.e. in incidence on the prism area to be formed by the second electrode pair and in output from the prism area. This is advantageous in largely bending output light toward an intended direction. Thus, it is possible to largely bend output light at a low drive voltage, even if the film thickness of the optical waveguide film made of an electro-optic medium is small.

On the other hand, unlike the prism area having a trapezoidal shape in cross section, a conventional rectangular parallelepiped optical deflection element changes the optical path only in two stages i.e. in incidence and in output. According to the conventional art, it is required to increase the film thickness of electro-optic crystal in order to largely bend the optical path. In contrast, forming the prism area having a trapezoidal shape in cross section as described in the above aspect makes it possible to stepwise change the optical path of output light. Specifically, different optical paths are provided in three stages i.e. in output from the prism area to be formed by the first electrode pair, in incidence on the prism area to be formed by the second electrode pair, and in output from the prism area to be formed by the second electrode pair. Thus, it is possible to largely bend the optical path of output light.

Further, in any of the above aspects, for instance, in the optical deflection element according to an aspect of the invention may be configured such that the first electrode is formed into a rectangular shape, the second electrode is formed into a rectangular shape having a surface area smaller than a surface area of the rectangular shape of the first electrode, and the first electrode and the second electrode form a quadrangular prism in an area of the optical waveguide film sandwiched between the first electrode and the second electrode by application of the second applied voltage, the quadrangular prism having a trapezoidal shape in cross section along the direction of travel of the light beam transmitting through the optical waveguide film.

In the above configuration, forming the second electrode into a rectangular shape having a surface area smaller than the surface area of the first electrode makes it possible to form a quadrangular prism, in the area of the optical waveguide film sandwiched between the first electrode and the second electrode, having a trapezoidal shape in cross section along the direction of travel of the light beam transmitting through the optical waveguide film. This makes it possible to form the prism area serving as a quadrangular prism into any trapezoidal shape in cross section. Forming the prism area having a trapezoidal shape in cross section as described above makes it possible to deflect light in two stages i.e. in incidence on the prism area to be formed by the second electrode pair, and in output from the prism area. This is advantageous in largely bending output light toward an intended direction. Thus, it is possible to largely bend output light at a low drive voltage, even if the film thickness of the optical waveguide film made of an electro-optic medium is small.

On the other hand, unlike the prism area having a trapezoidal shape in cross section, a conventional rectangular parallelepiped optical deflection element changes the optical path only in two stages i.e. in incidence and in output. According to the conventional art, it is required to increase the film thickness of electro-optic crystal in order to largely bend the optical path. In contrast, forming the prism area having a trapezoidal shape in cross section as described in the above aspect makes it possible to stepwise change the optical path of output light. Specifically, different optical paths are provided in three stages i.e. in output from the prism area to be formed by the first electrode pair, in incidence on the prism area to be formed by the second electrode pair, and in output from the prism area to be formed by the second electrode pair. Thus, it is possible to largely bend the optical path of output light.

Further, in the above aspect, for instance, the optical deflection element according to an aspect of the invention may be configured such that the first electrode is disposed on a side of the substrate of the optical waveguide film, and the second electrode is disposed on an opposite side of the substrate of the optical waveguide film.

In the above configuration, it is possible to bend output light, while efficiently transmitting the light beam in the optical waveguide film between the first electrode and the second electrode.

Further, in any one of the above aspects, for instance, the optical deflection element according to an aspect of the invention may be configured such that the second electrode is disposed to face a middle area of the first electrode in the direction of travel of the light beam transmitting through the optical waveguide film.

In the above configuration, it is possible to form a prism area having a symmetrical trapezoidal shape in cross section with respect to normal in a direction perpendicular to the principal plane of the substrate. Thus, it is possible to form a prism area having a trapezoidal shape in cross section, in which the base angles are equal to each other. This is advantageous in facilitating control of the direction of travel of output light.

Further, in the above aspect, for instance, the optical deflection element according to an aspect of the invention may be configured such that a refractive index of a prism area of the optical waveguide film sandwiched between the first electrode pair is changed by application of the first applied voltage to the first electrode pair, and a refractive index of a prism area of the optical waveguide film sandwiched between the second electrode pair is changed by application of the second applied voltage to the second electrode pair.

In the above configuration, it is possible to form a prism area, in which the refractive index is changed by the first applied voltage, and to form a prism area, in which the refractive index is changed by the second applied voltage, with respect to one optical waveguide film formed on one substrate. In the above configuration, changing the refractive index of the prism area of the optical waveguide film sandwiched between the first electrode pair by the first applied voltage to be applied to the first electrode pair makes it possible to bend the direction of a light beam in a plane parallel to the principal plane of the substrate, for instance. Further, changing the refractive index of the prism area of the optical waveguide film sandwiched between the second electrode pair by the second applied voltage to be applied to the second electrode pair makes it possible to bend output light in a direction different from the direction of the light beam bent by the first electrode pair, for instance, in a direction perpendicular to the principal plane of the substrate. Thus, it is possible to realize an optical deflection element capable of efficiently deflecting light two-dimensionally, even if the optical deflection element is small in size.

Further, in any one of the above aspects, for instance, the optical deflection element according to an aspect of the invention may be configured such that the first electrode pair is formed such that the electrode pair has a triangular shape identical to each other, and the first electrode pair forms a triangular prism in an area of the optical waveguide film sandwiched between the first electrode pair by application of the first applied voltage. In this configuration, it is possible to deflect the light beam in a horizontal direction to the principal plane of the substrate.

Further, in any one of the above aspects, for instance, the optical deflection element according to an aspect of the invention may be configured as follows. The first electrode and the second electrode form a prism area in an area of the optical waveguide film sandwiched between the first electrode and the second electrode by application of the second applied voltage, the prism area having a refractive index different from a refractive index of the optical waveguide film before application of the second applied voltage. The prism area includes a first boundary surface and a second boundary surface serving as a boundary between a portion of the optical waveguide film devoid of the prism area, and the prism area. The first boundary surface and the second boundary surface are inclined with respect to the film thickness direction of the optical waveguide film. A light beam to be incident on the prism area is deflected in the film thickness direction of the optical waveguide film on the first boundary surface, and is deflected in the film thickness direction of the optical waveguide film on the second boundary surface.

In the above configuration, it is possible to deflect a light beam that is deflected in the in-plane direction of the optical waveguide film in the film thickness direction of the optical waveguide film in two stages when the light beam passes through the first boundary surface and the second boundary surface of the prism area, specifically, in incidence on the first boundary surface of the prism area, and in output from the second boundary surface of the prism area. This is advantageous in largely bending output light toward an intended direction. Thus, it is possible to largely bend output light at a low drive voltage, even if the film thickness of the optical waveguide film is small.

Further, in any one of the above aspects, for instance, the optical deflection element according to an aspect of the invention may be configured such that the substrate has a refractive index smaller than a refractive index of the optical waveguide film. In this configuration, it is possible to efficiently transmit the light beam, using the optical waveguide film as a core.

In any one of the above aspects, for instance, the optical deflection element according to an aspect of the invention may be configured such that each of the first electrode pair and the second electrode pair has a refractive index smaller than a refractive index of the optical waveguide film. In this configuration, it is possible to efficiently transmit the light beam, using the optical waveguide film as a core.

Further, in any one of the above aspects, for instance, the optical deflection element according to an aspect of the invention may be configured such that each of the first electrode pair and the second electrode pair is a plurality of pairs of electrodes.

In the above configuration, multitudes of prism areas are formed by the first electrode pairs and the second electrode pairs, and the deflection angle of output light is equal to the sum of refraction angles in the prism areas. Accordingly, it is possible to remarkably increase the deflection angle of output light. Specifically, a further increase in the deflection angle is enabled. This is advantageous in two-dimensionally deflecting light in a wide range, and in increasing the area in which a light beam is scanned.

Further, in any one of the above aspects, for instance, the optical deflection element according to an aspect of the invention may be further provided with a clad layer formed between the optical waveguide film and the first electrode pair, and between the optical waveguide film and the second electrode pair.

In the above configuration, it is possible to prevent leakage of an electromagnetic field to the first electrode pair and to the second electrode pair to thereby avoid absorption of transmitted light. Thus, it is possible to suppress transmission loss in the optical waveguide film to thereby enhance the light use efficiency.

Further, in any one of the above aspects, the optical deflection element according to an aspect of the invention may be configured such that the electro-optic medium forming the optical waveguide film has a composition represented by $KTa_{1-x}Nb_xO_3$ (where x is 0<x<1).

In the above configuration, it is possible to suppress the applied voltage necessary in changing the refractive index of the optical waveguide film to be low. Thus, it is possible to provide an optical deflection element capable of performing optical deflection at a low drive voltage.

Further, an optical deflection device according to an aspect of the invention is provided with a light source; the optical deflection element according to any one of the above aspects which deflects light incident from the light source; an optical system provided on at least one of the light incident side and the light output side of the optical deflection element; and a drive device which applies the first applied voltage and the second applied voltage to the optical deflection element for driving the optical deflection element.

In the above configuration, it is possible to deflect light by the first applied voltage and to deflect light by the second applied voltage as intended. Thus, it is possible to perform two-dimensional optical deflection as intended. For instance, when the optical deflection element performs two-dimensional optical deflection by horizontal scanning and vertical scanning, it is possible to deflect light in a horizontal direction by horizontal scanning and to deflect light in a vertical direction by vertical scanning as intended. Thus, it is possible to perform two-dimensional optical deflection as intended.

(First Embodiment)

In the following, a configuration example of an optical deflection element and an optical deflection device in the first embodiment of the invention is described in details referring to FIG. 1 to FIG. 10.

Figure 1:
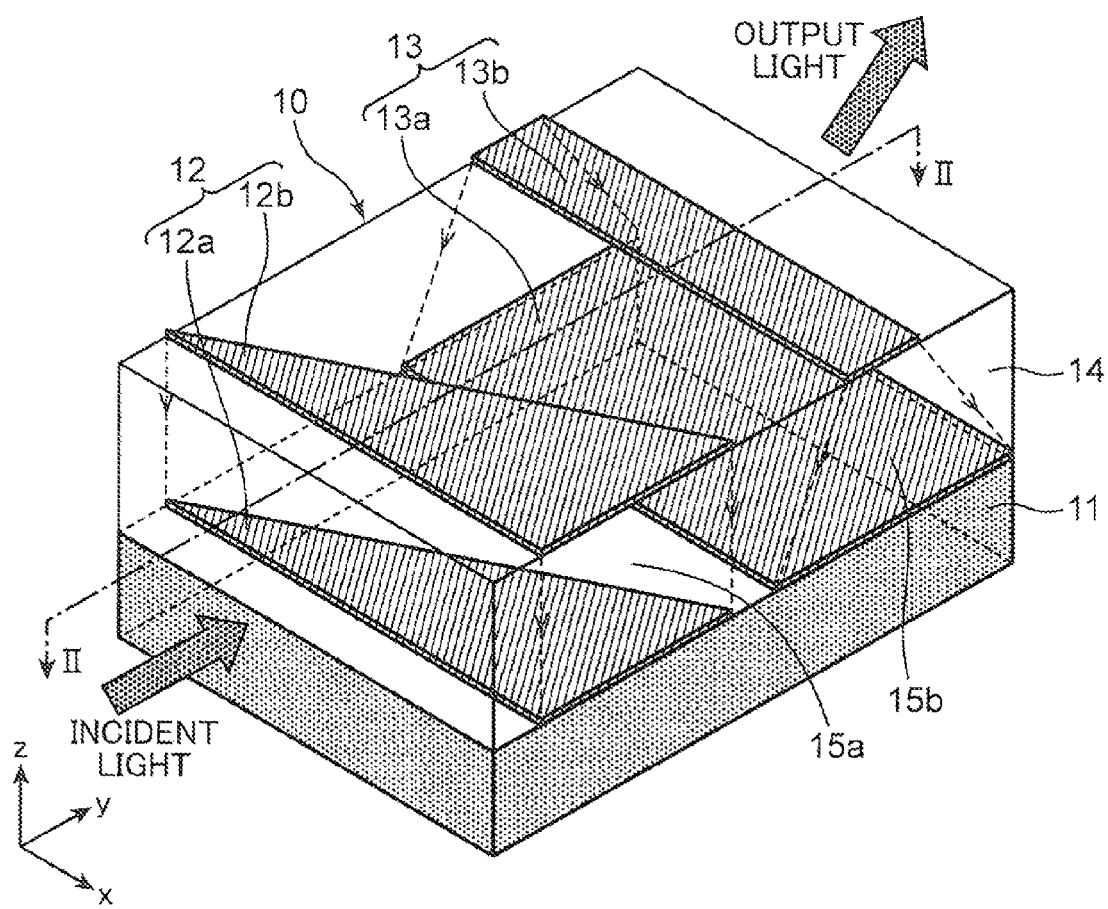
FIG. 1 is a perspective view of an optical deflection element according to the first embodiment of the invention.
Figure 2:
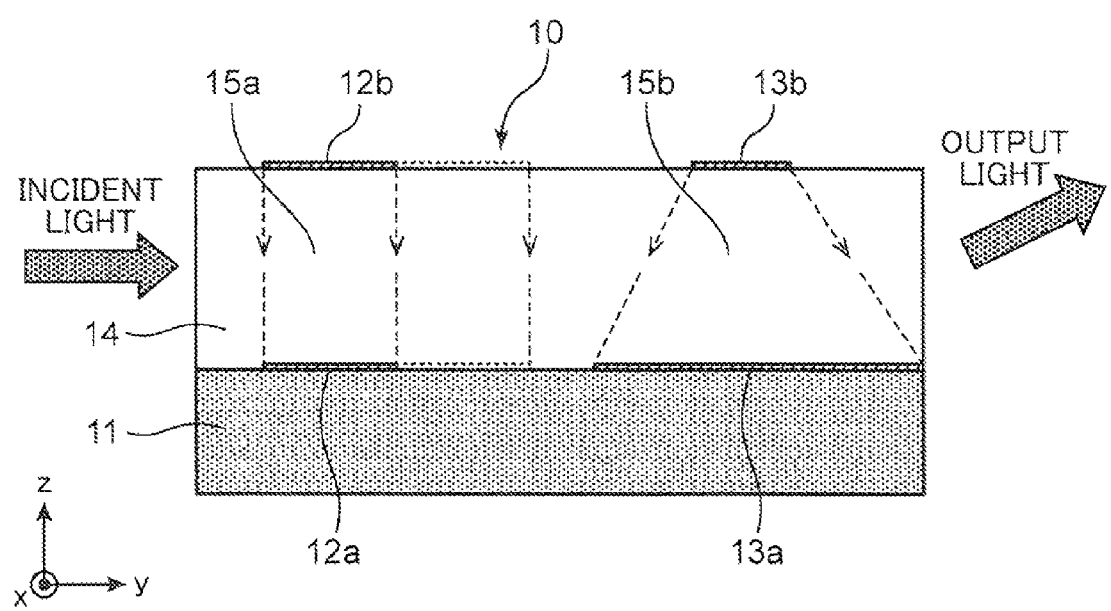
FIG. 2 is a cross-sectional view of the optical deflection element taken along the line II-II in FIG. 1.
Figure 3:
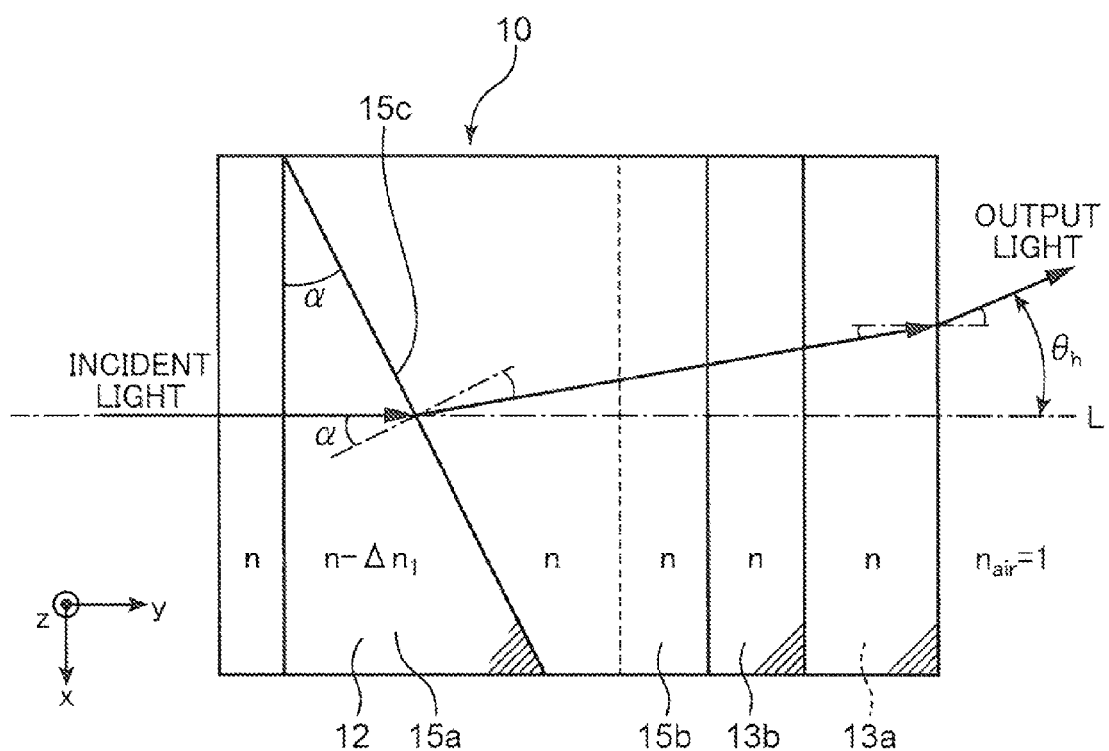
FIG. 3 is a top plan view for describing an operation of the optical deflection element illustrated in FIG. 1.
Figure 4:
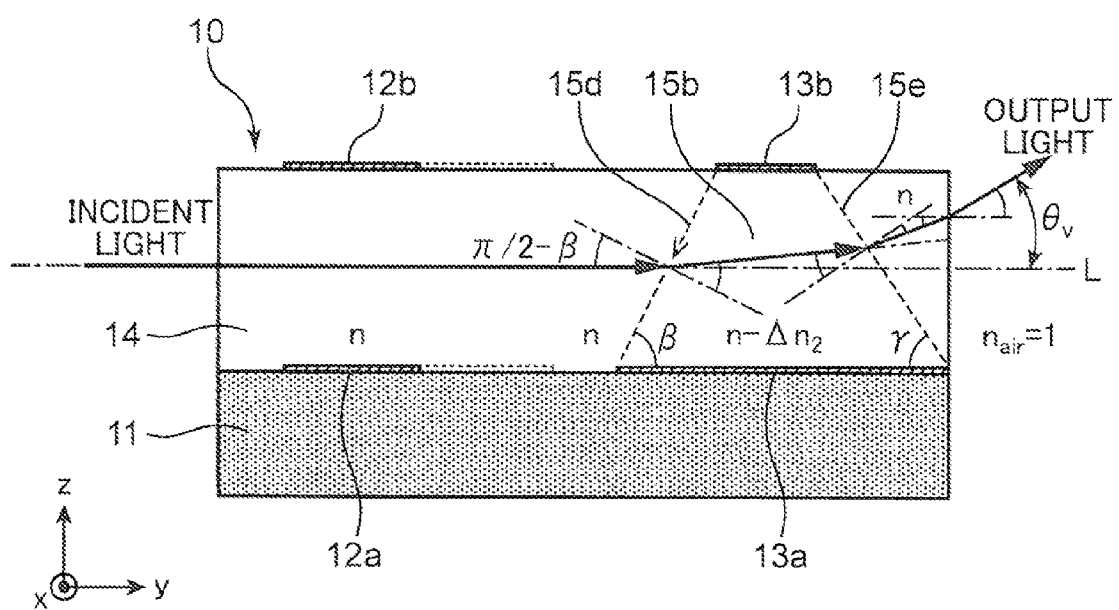
FIG. 4 is a cross-sectional view of the optical deflection element taken along the line II-II in FIG. 1 for describing an operation of the optical deflection element illustrated in FIG. 1.

FIG. 1 is a perspective view of the optical deflection element according to the first embodiment of the invention, and FIG. 2 is a sectional view of the optical deflection element taken along the line II-II in FIG. 1. FIG. 3 is a top plan view for describing an operation of the optical deflection element illustrated in FIG. 1, and FIG. 4 is a sectional view of the optical deflection element taken along the line II-II in FIG. 1 for describing an operation of the optical deflection element illustrated in FIG. 1. FIG. 5 to FIG. 9 are first to fifth perspective views for describing a manufacturing process of the optical deflection element illustrated in FIG. 1. FIG. 10 is a schematic configuration diagram illustrating an example of an optical deflection device incorporated with the optical deflection element illustrated in FIG. 1.

First of all, an optical deflection element 10 in the first embodiment is described. As illustrated in FIG. 1 and FIG. 2, the optical deflection element 10 in the first embodiment is provided with a substrate 11; an optical waveguide film 14 made of an electro-optic medium and constituting an optical waveguide formed on the substrate 11; a first electrode pair 12 disposed on the incident side of the optical waveguide film 14 at a position facing the film thickness direction (e.g. z-axis direction in FIG. 1 and FIG. 2) of the optical waveguide film 14, and configured to deflect a light beam transmitting through the optical waveguide film 14 in an in-plane direction (in a direction perpendicular to the film thickness direction of the optical waveguide film 14, e.g. xy-plane direction in FIG. 1 and FIG. 2) of the optical waveguide film 14 in accordance with a first applied voltage; and a second electrode pair 13 disposed on the output side of the optical waveguide film 14 at a position facing the film thickness direction of the optical waveguide film 14, and configured to deflect the light beam deflected in the in-plane direction of the optical waveguide film 14 by the first electrode pair 12 in the film thickness direction of the optical waveguide film 14 in accordance with a second applied voltage.

The first applied voltage and the second applied voltage in accordance with the deflection angle of a light beam are applied to the first electrode pair 12 and to the second electrode pair 13 of the optical deflection element 10 by a voltage control device (e.g. a drive device 22 illustrated in FIG. 10), which is not illustrated in FIG. 1 and FIG. 2.

The first electrode pair 12 is constituted of a first lower electrode 12a, and a first upper electrode 12b. The second electrode pair 13 is constituted of a second lower electrode 13a, and a second upper electrode 13b. The first lower electrode 12a, the first upper electrode 12b, the second lower electrode 13a, and the second upper electrode 13b are formed independently of each other.

The optical waveguide film 14 is formed on the substrate 11 provided with the first lower electrode 12a and the second lower electrode 13a. The first upper electrode 12b and the second upper electrode 13b are formed on the optical waveguide film 14. The second lower electrode 13a and the second upper electrode 13b are formed to have lengths different from each other in the direction (e.g. y-axis direction in FIG. 1 and FIG. 2) of travel of a light beam transmitting through the optical waveguide film 14.

The second lower electrode 13a is disposed on the side of the substrate 11 of the optical waveguide film 14. The second upper electrode 13b is disposed on the opposite side of the substrate 11 of the optical waveguide film 14. The length of the second lower electrode 13a in the direction of travel of the light beam transmitting through the optical waveguide film 14 is longer than the length of the second upper electrode 13b in the direction of travel. The second upper electrode 13b is disposed to face the middle area of the second lower electrode 13a in the direction of travel of the light beam transmitting through the optical waveguide film 14.

Specifically, the first electrode pair 12 (the first lower electrode 12a and the first upper electrode 12b) of a right-angled triangular shape are formed on the upper surface corresponding to the light incident side of the optical waveguide film 14 and on the lower surface thereof facing the upper surface in such a manner that the bottom side thereof is orthogonal to the light transmitting direction (y-axis direction in FIG. 1 and FIG. 2) i.e. in the direction of travel of the light beam transmitting through the optical waveguide film 14 and is located on the light incident side. Further, an asymmetrical rectangular second electrode pair 13 (the second lower electrode 13a and the second upper electrode 13b), whose lengths differ from each other in the light transmitting direction, are formed on the downstream side of the first electrode pair 12 in the light transmitting direction.

As will be described later, the above configuration makes it possible to two-dimensionally deflect a light beam at a high speed with use of one substrate 11 to thereby miniaturize the optical deflection element 10.

The relationship of lengths between the second lower electrode 13a and the second upper electrode 13b in the direction of travel of the light beam transmitting through the optical waveguide film 14 is not specifically limited to the above example. The lengths may be different from each other in the direction of travel of the light beam transmitting through the optical waveguide film 14. For instance, the second lower electrode may be disposed on the side of the substrate 11 of the optical waveguide film 14, the second upper electrode may be disposed on the opposite side of the substrate 11 of the optical waveguide film 14, and the length of the second lower electrode in the direction of travel of the light beam transmitting through the optical waveguide film 14 may be shorter than the length of the second upper electrode in the direction of travel. The above configuration also makes it possible to obtain substantially the same advantageous effects as the foregoing.

Further, the shape of the first electrode pair 12 is not specifically limited to a right-angled triangular shape. For instance, the first electrode pair may be formed into a triangular shape other than the above triangular shape, a shape such that the width is gradually reduced toward the light transmitting direction, a shape such that the width is gradually increased toward the light transmitting direction, or a shape such that the width is gradually increased, and then is gradually reduced.

As a material of the substrate 11 of the optical deflection element 10 in the first embodiment, it is desirable to use a material capable of forming a conductive single-crystal film or a semiconductive single-crystal film serving as the first lower electrode 12a and the second lower electrode 13a into an epitaxial film. As a condition capable of retaining the epitaxial relationship, it is desirable that the crystal structure of the material of the substrate 11 is analogous to the crystal structure of the material forming the first lower electrode 12a and the second lower electrode 13a, and of the electro-optic medium forming the optical waveguide film 14, and that the lattice constant difference between the crystal structures is not larger than 10%. However, as far as it is possible to retain the epitaxial relationship by epitaxially growing the first lower electrode 12a and the second lower electrode 13a on the substrate 11, it is not necessary to follow the relationship.

Specifically, it is possible to use oxides such as $Al_2O_3$ and $SrTiO_3$, monolithic semiconductors such as Si, Ge, and diamond, or group III-V compound semiconductors such as GaAs, InP, InSb, and AlGaAs, as a material of the substrate 11. Further, when the electro-optic medium forming the optical waveguide (the optical waveguide film 14) is an oxide, it is preferable to use an oxide, and desirably, a material having a refractive index smaller than the refractive index of the optical waveguide film 14, as a material of the substrate 11. For instance, in the embodiment, $Al_2O_3$ is used as the substrate 11.

As described above, preferably, the substrate 11 has a refractive index smaller than the refractive index of the optical waveguide film 14. Setting the refractive index of the substrate 11 to be smaller than the refractive index of the optical waveguide film 14 makes it possible to efficiently transmit a light beam, using the optical waveguide film 14 as a core.

As a material of the first lower electrode 12a and the second lower electrode 13a of the optical deflection element 10, it is possible to use a material having a refractive index smaller than the refractive index of the electro-optic medium forming the optical waveguide (the optical waveguide film 14), and capable of forming a conductive single-crystal film or a semiconductive single-crystal film into an epitaxial film. As a condition capable of retaining the epitaxial relationship, it is desirable that the crystal structure of the material of the electrode (the first lower electrode 12a and the second lower electrode 13a) is analogous to the crystal structure of the material forming the substrate 11, and of the electro-optic medium forming the optical waveguide film 14, and that the lattice constant difference between the crystal structures is not larger than 10%. However, as far as it is possible to retain the epitaxial relationship by epitaxially growing the first lower electrode 12a and the second lower electrode 13a on the substrate 11, it is not necessary to follow the relationship.

Specifically, it is possible to use various metals such as Al, Ti, Cr, Ni, Cu, Pd, Ag, Ta, W, Pt, and Au, alloys of these metals, or transparent oxides having a refractive index smaller than the refractive index of the optical waveguide film 14 such as ITO and Al-doped ZnO, as a material of the first lower electrode 12a and the second lower electrode 13a. In particular, when an oxide such as $Al_2O_3$ or $SrTiO_3$ is used as a material of the substrate 11, it is desirable to use Pt as a material of the first lower electrode 12a and the second lower electrode 13a. For instance, in the embodiment, Pt is used as a material of the first lower electrode 12a and the second lower electrode 13a.

As well as the above case, as a material of the first upper electrode 12b and the second upper electrode 13b of the optical deflection element 10, it is possible to use various metals such as Al, Ti, Cr, Ni, Cu, Pd, Ag, Ta, W, Pt, and Au, alloys of these metals, or transparent oxides having a refractive index smaller than the refractive index of the optical waveguide film 14 such as ITO and Al-doped ZnO. However, the first upper electrode 12b and the second upper electrode 13b may not necessarily be a film epitaxial to the electro-optic medium forming the optical waveguide film 14.

Further, it is possible to form the first upper electrode 12b and the second upper electrode 13b of a metal. In particular, in forming a metal electrode on the optical waveguide film 14, if the number of vibrations of light in the optical waveguide film 14 exceeds the number of plasma oscillations of metal, a component leaked to the metal electrode may be strongly absorbed by carriers in the metal electrode, as light is transmitted. This results in transmission loss. It is desirable to use a transparent oxide such as ITO or Al-doped ZnO, as a material of the first upper electrode 12b and the second upper electrode 13b. For instance, in the embodiment, ITO is used as a material of the first upper electrode 12b and the second upper electrode 13b.

Further, preferably, the first electrode pair 12 and the second electrode pair 13 have a refractive index smaller than the refractive index of the optical waveguide film 14. Setting the refractive index of the first electrode pair 12 and the second electrode pair 13 to be smaller than the refractive index of the optical waveguide film 14 makes it possible to efficiently transmit a light beam, using the optical waveguide film 14 as a core.

It is possible to form a prism area 15a whose refractive index is different from the refractive index of the area surrounding the prism area 15a by forming the first electrode pair 12 into a triangular shape, and by applying a predetermined voltage (a first applied voltage) to the first electrode pair 12.

Specifically, the refractive index of the prism area 15a of the optical waveguide film 14 sandwiched between the first electrode pair 12 is changed by application of the first applied voltage to the first electrode pair 12. The first electrode pair 12 is configured such that the electrode pair has a triangular shape identical to each other. Accordingly, applying the first applied voltage to the first electrode pair 12 makes it possible to form a triangular prism (the prism area 15a) in the area of the optical waveguide film 14 sandwiched between the first electrode pair 12.

Further, it is possible to form a prism area 15b whose refractive index is different from the refractive index of the area surrounding the prism area 15b by forming the second electrode pair 13 into an asymmetrical rectangular shape whose lengths differ from each other in the light transmitting direction, and by applying a predetermined voltage (a second applied voltage) to the second electrode pair 13.

Specifically, the refractive index of the prism area 15b of the optical waveguide film 14 sandwiched between the second lower electrode 13a and the second upper electrode 13b is changed by application of the second applied voltage to the second lower electrode 13a and the second upper electrode 13b. The second lower electrode 13a is formed into a rectangular shape, and the second upper electrode 13b is formed into a rectangular shape of a surface area smaller than the surface area of the rectangular shape of the second lower electrode 13a. Accordingly, it is possible to form a quadrangular prism (the prism area 15b) of a trapezoidal shape in cross section along the direction of travel of a light beam transmitting through the optical waveguide film 14 in the area of the optical waveguide film 14 sandwiched between the second lower electrode 13a and the second upper electrode 13b by applying the second applied voltage.

As an electro-optic medium forming the optical waveguide film 14, it is preferable to use an electro-optic medium having an electro-optic effect such as KTN ($KTa_{1-x}Nb_xO_3$, where x is 0<x<1), lithium niobate ($LiNbO_3$), lithium tantalate ($LiTaO_3$), or KTP ($KTiOPO_4$). Among these, it is desirable to use KTN in the aspect of securing a large deflection angle at a low drive voltage. For instance, the refractive index of KTN is as large as from 2.2 to 2.4. Accordingly, it is possible to secure a large deflection angle at a low drive voltage.

Further, KTN has a property such that the crystal system is transformed from cubic to tetragon, and then from tetragon to rhombohedron, as the temperature varies. It is known that a cubical crystal exhibits a large second-order electro-optic effect. In particular, in a temperature region near the phase transition temperature at which crystal is transformed from cubic to tetragon, there occurs a phenomenon such that the relative permittivity diverges. Thus, the second-order electro-optic effect which is proportional to a square of the relative permittivity is significantly large.

The electro-optic medium having a composition as represented by $KTa_{1-x}Nb_xO_3$ (where x is 0<x<1), as an electro-optic medium forming the optical waveguide film 14, is capable of suppressing an applied voltage necessary in changing the refractive index, as compared with other materials. According to this configuration, it is possible to provide an optical deflection element capable of securing a large deflection angle at a low drive voltage.

In the following, a principle of operation of the optical deflection element 10 utilizing an electro-optic effect is described. Generally, when electro-optic crystal exhibits a refractive index change by Kerr effect, a refractive index variation Δn of electro-optic crystal when an electric field is formed in the crystal is given by the following formula (1).

$$\Delta n = -(1/2) \times n^3 \times R \times (V/d)^2 \qquad (1)$$

The term "Kerr effect" means an effect such that the refractive index of electro-optic crystal is changed in proportion to a square of the magnitude of an electric field applied to the electro-optic crystal. Further, in the formula (1), V indicates an applied voltage, d indicates a thickness of electro-optic crystal, n indicates a refractive index of electro-optic crystal, and R indicates Kerr constant.

According to the above configuration, when voltages $V_1$ and $V_2$ are applied between the first electrode pair 12 and between the second electrode pair 13, with the optical waveguide film 14 having the refractive index n and made of an electro-optic medium having the thickness d being interposed, specifically, in z-axis direction, as illustrated in FIG. 1 to FIG. 4, the refractive index is changed in the areas respectively sandwiched between the first electrode pair 12 and between the second electrode pair 13, and in the area other than the above areas within the optical waveguide film 14, whereby the prism areas 15a and 15b are formed.

Let it be assumed that $\Delta n_1$ is a refractive index variation of the prism area 15a to be formed by the first electrode pair 12, and $\Delta n_2$ is a refractive index variation of the prism area 15b to be formed by the second electrode pair 13. Incident light is refracted on a boundary surface of each of the prism area 15a and the prism area 15b, in which the refractive index is changed. As a result of the above operation, output light from the optical waveguide film 14 is deflected. Further, the deflection angle of light to be output from the optical deflection element 10 is calculated by Snell's law.

Specifically, when the voltage $V_1$ is applied to the first electrode pair 12, as illustrated in FIG. 3, the refractive index of the prism area 15a to be formed by the first electrode pair 12 of a right-angled triangular shape having the base angle α is uniformly changed to n−$\Delta n_1$, and a boundary surface 15c in which the refractive index is changed from from n−$\Delta n_1$ to n is formed. Whereas the boundary surface of the bottom-side portion of the prism area 15a is orthogonal to the transmitting direction L of incident light, the boundary surface 15c is inclined counterclockwise by αdegrees with respect to x-axis.

Accordingly, incident light incident in parallel to y-axis is deflected in minus x-axis direction in xy-plane after having passed through the boundary surface 15c of the prism area 15a formed between the first electrode pair 12, and then, is deflected in minus x-axis direction in xy-plane when being output from the optical waveguide film 14. Finally, output light is deflected by the deflection angle $θ_h$ with respect to the transmitting direction L (y-axis direction in FIG. 3) of incident light in a plane (in xy-plane in FIG. 3) parallel to the surface (the principal plane) of the substrate 11.

Further, when the voltage $V_2$ is applied to the second electrode pair 13, as illustrated in FIG. 4, the refractive index of the prism area 15b of a trapezoidal shape in cross section having the base angle β and the base angle γ to be formed by the asymmetric rectangular second electrode pair 13 whose lengths differ from each other in the light transmitting direction L is uniformly changed to n−$\Delta n_2$; and a boundary surface 15d in which the refractive index is changed from n to n−$\Delta n_2$, and a boundary surface 15e in which the refractive index is changed from n−$\Delta n_2$ to n are formed. The boundary surface 15d is inclined counterclockwise by β degrees with respect to y-axis, and the boundary surface 15e is inclined clockwise by γ degrees with respect to y-axis.

As described above, the second lower electrode 13a and the second upper electrode 13b form the prism area 15b having the refractive index n−Δn$_2$, which is different from the refractive index n of the optical waveguide film 14 before application of the voltage V$_2$, in the area of the optical waveguide film 14 sandwiched between the second lower electrode 13a and the second upper electrode 13b, by application of the voltage V$_2$. The prism area 15b includes the boundary surface 15d and the boundary surface 15e serving as a boundary between a portion of the optical waveguide film 14 devoid of the prism area 15b, and the prism area 15b. The boundary surface 15d and the boundary surface 15e are inclined with respect to the film thickness direction (z-axis direction in FIG. 4) of the optical waveguide film 14. A light beam to be incident on the prism area 15b is deflected in the film thickness direction of the optical waveguide film 14 on the boundary surface 15d, and is deflected in the film thickness direction of the optical waveguide film 14 on the boundary surface 15e.

Accordingly, the light beam deflected in minus x-axis direction in xy-plane by the prism area 15a is deflected in z-axis direction in two stages when passing through the boundary surface 15d and the boundary surface 15e of the prism area 15b formed between the second electrode pair 13, and then, is deflected in z-axis direction when being output from the optical waveguide film 14. Finally, output light is deflected by the deflection angle θ$_v$ with respect to the transmitting direction L of incident light in a plane perpendicular to the surface (the principal plane) of the substrate 11.

As described above, in the prism area 15b illustrated in FIG. 4, light is deflected in two stages i.e. in incidence on the boundary surface 15d of the prism area 15b and in output from the boundary surface 15e of the prism area 15b. Specifically, causing a refractive index change in two stages makes it possible to largely bend output light toward an intended direction. As a result of this operation, it is possible to largely bend output light at a low drive voltage, even if the thickness d of the optical waveguide film 14 made of an electro-optic medium is small.

As described above, providing the triangular first electrode pair 12, and the asymmetrical rectangular second electrode pair 13 whose lengths differ from each other in the light transmitting direction on the optical waveguide film 14, and applying a voltage to the first electrode pair 12 and the second electrode pair 13 makes it possible to form the prism areas 15a and 15b between the first electrode pair 12 and between the second electrode pair 13, respectively, and makes it possible to two-dimensionally deflect light in a plane parallel to the surface of the substrate 11 and in a plane perpendicular to the surface of the substrate 11 by the prism areas 15a and 15b.

The electric field to be applied to the first electrode pair 12 and the electric field to be applied to the second electrode pair 13 are determined by the thickness d of the electro-optic medium (the optical waveguide film 14). Accordingly, it is possible to two-dimensionally deflect light at a low drive voltage by reducing the thickness d of the optical waveguide film 14. In view of the above, it is preferable to set the thickness d of the optical waveguide film 14 to be not smaller than 1 μm but not larger than 10 μm. In this configuration, it is possible to transmit a light beam, without setting the waveguide mode to a single mode in the optical waveguide film 14, and to drive at a low drive voltage (e.g. at 80 V or lower).

Further, the length of the side in parallel to y-axis direction (the transmitting direction L of incident light) of each of the second electrode pair 13 (the second lower electrode 13a and the second upper electrode 13b) is preferably longer than the thickness d of the optical waveguide film 14, and more preferably 10 μm or longer. In this configuration, it is possible to largely deflect a light beam in the film thickness direction (z-axis direction in FIG. 4) of the optical waveguide film 14 at a low drive voltage.

Further, the positional relationship of the second electrode pair 13 (the second lower electrode 13a and the second upper electrode 13b) is such that a rectangular electrode may be disposed so that the base angles β and γ of the trapezoid, which is a cross-sectional shape of the prism area 15b to be formed by the second electrode pair 13 taken along yz plane, satisfy any base angles β and γ. Further, the short side (the side in parallel to y-axis direction in FIG. 3) of the second lower electrode 13a may be disposed symmetrical or asymmetrical with respect to the center axis of the short side (the side in parallel to y-axis direction in FIG. 3) of the second upper electrode 13b.

Based on the above principle, a practical example is described as follows, in which a light deflection angle is calculated on the basis of a refractive index change in the inside of the optical waveguide film 14. In this example, the refractive index of KTN as an electro-optic medium forming the optical waveguide film 14 is n=2.3, Kerr constant is R=5.3×10$^{-16}$m$^2$V$^2$, and the thickness of the optical waveguide film 14 is d=4 μm. Further, the base angle of the first electrode pair 12 is α=30°, and the base angles of the trapezoid, which is a cross-sectional shape of the prism area 15b to be formed by the second electrode pair 13, are respectively β=60° and γ=60°.

In this configuration, by applying a voltage of 40 V to each of the electrode pairs, the deflection angle θ$_h$ in a horizontal direction to the surface (the principal plane) of the substrate 11 is 10° or larger, and the deflection angle θ$_v$ in a direction perpendicular to the surface (the principal plane) of the substrate 11 is 10° or larger. Thus, it is possible to largely deflect a light beam two-dimensionally at a low drive voltage and at a high speed.

The number and the arrangement of the first electrode pair 12 are not specifically limited to the above example. For instance, a plurality of first electrode pairs 12 may be formed to align in the light transmitting direction of the optical waveguide film 14 so that a light beam can sequentially pass through the first electrode pairs 12. Forming a plurality of prism areas 15a in the optical waveguide film 14 by forming the plurality of first electrode pairs 12 in the optical waveguide film 14 as described above makes it possible to increase the deflection angle θ$_h$ in a plane parallel to the surface of the substrate 11, because the deflection angle of output light is equal to the sum of refraction angles in the prism areas.

Likewise, a plurality of second electrode pairs 13 may be formed to align in the light transmitting direction of the optical waveguide film 14 so that a light beam can sequentially pass through the second electrode pairs 13. Forming a plurality of prism areas 15b in the optical waveguide film 14 by forming the plurality of second electrode pairs 13 in the optical waveguide film 14 as described above makes it possible to increase the deflection angle θ$_v$ in a plane perpendicular to the surface of the substrate 11, because the deflection angle of output light is equal to the sum of refraction angles in the prism areas.

As described above, increasing the deflection angle θ$_h$ and the deflection angle θ$_v$ is advantageous in two-dimensionally deflecting light in a wide range, and in increasing the area in which light is scanned.

As described above, according to the embodiment, it is possible to two-dimensionally deflect light at a low drive voltage by combining deflection in a horizontal direction by a refractive index change of the prism area 15a sandwiched between the triangular first electrode pair 12, and deflection in a vertical direction by a refractive index change of the prism area 15b sandwiched between the asymmetrical rectangular second electrode pair 13 whose lengths differ from each other in the light transmitting direction.

Next, a method for manufacturing the optical deflection element 10 in the first embodiment is described referring to FIG. 5 to FIG. 9.

[First Step]

Figure 5:
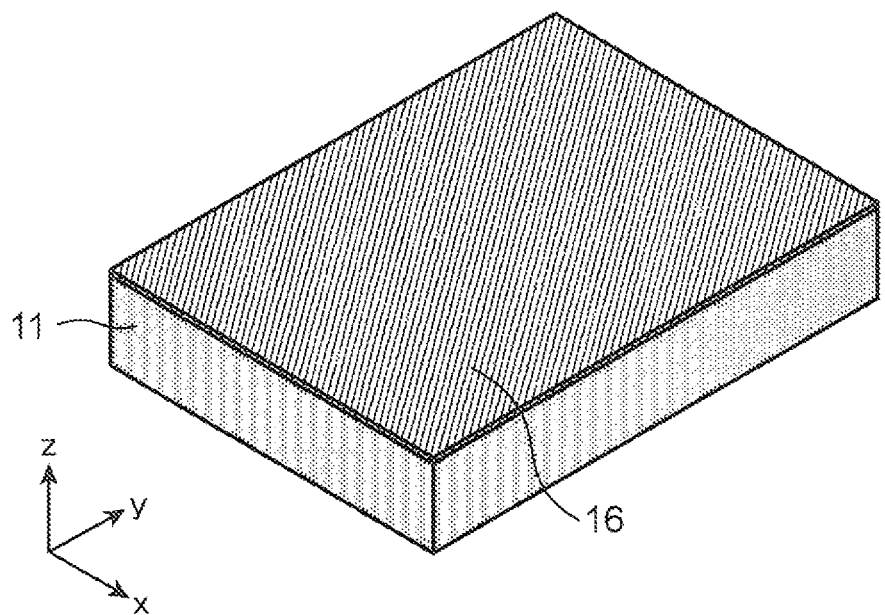
FIG. 5 is a first perspective view for describing a manufacturing process of the optical deflection element illustrated in FIG. 1.

First of all, as illustrated in FIG. 5, an epitaxial Pt electrode 16 of 100 nm in film thickness serving as a lower electrode is formed on the substrate 11 made of $Al_2O_3$ single crystal by sputtering.

[Second Step]

Figure 6:
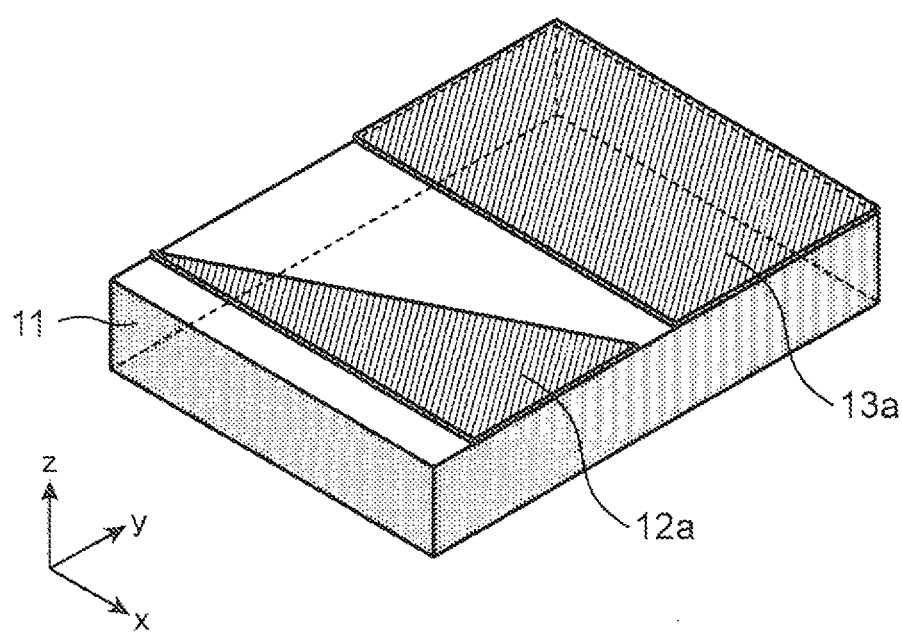
FIG. 6 is a second perspective view for describing the manufacturing process of the optical deflection element illustrated in FIG. 1.

Subsequently, as illustrated in FIG. 6, the triangular first lower electrode 12a and the rectangular second lower electrode 13a are formed by removing an unwanted portion from the Pt electrode 16 by etching.

[Third Step]

Figure 7:
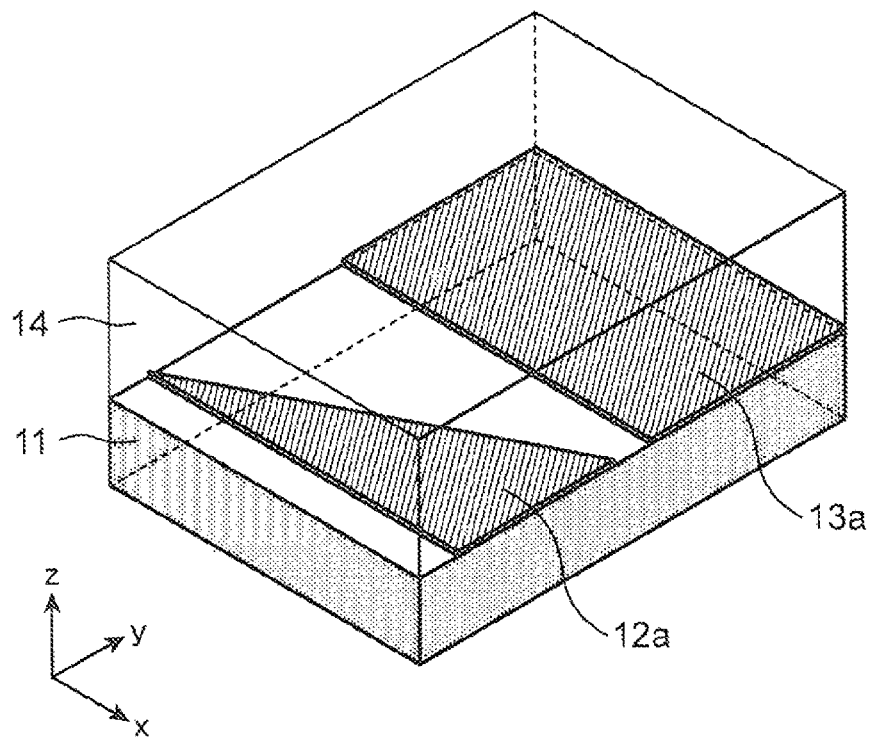
FIG. 7 is a third perspective view for describing the manufacturing process of the optical deflection element illustrated in FIG. 1.

Subsequently, as illustrated in FIG. 7, the epitaxial optical waveguide film 14 made of $KTa_{1-x}Nb_xO_3$ (x=0.3) of 4 μm in film thickness is formed on the substrate 11 made of $Al_2O_3$ single crystal, the first lower electrode 12a, and the second lower electrode 13a by sputtering.

[Fourth Step]

Figure 8:
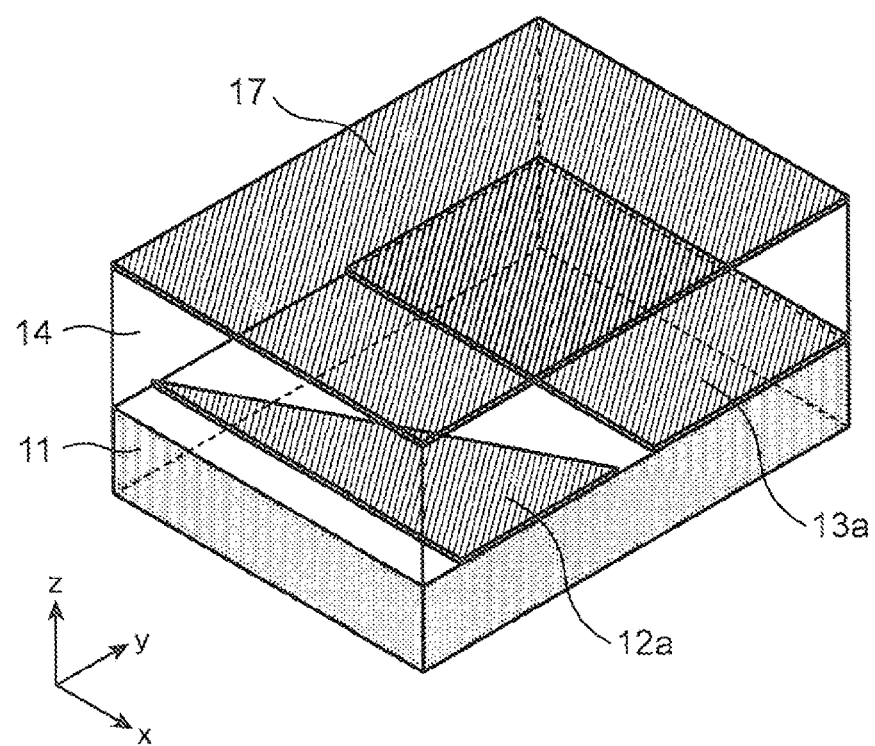
FIG. 8 is a fourth perspective view for describing the manufacturing process of the optical deflection element illustrated in FIG. 1.

Subsequently, as illustrated in FIG. 8, an ITO electrode 17 of 200 nm in film thickness serving as an upper electrode is formed on the optical waveguide film 14 by sputtering.

[Fifth Step]

Figure 9:
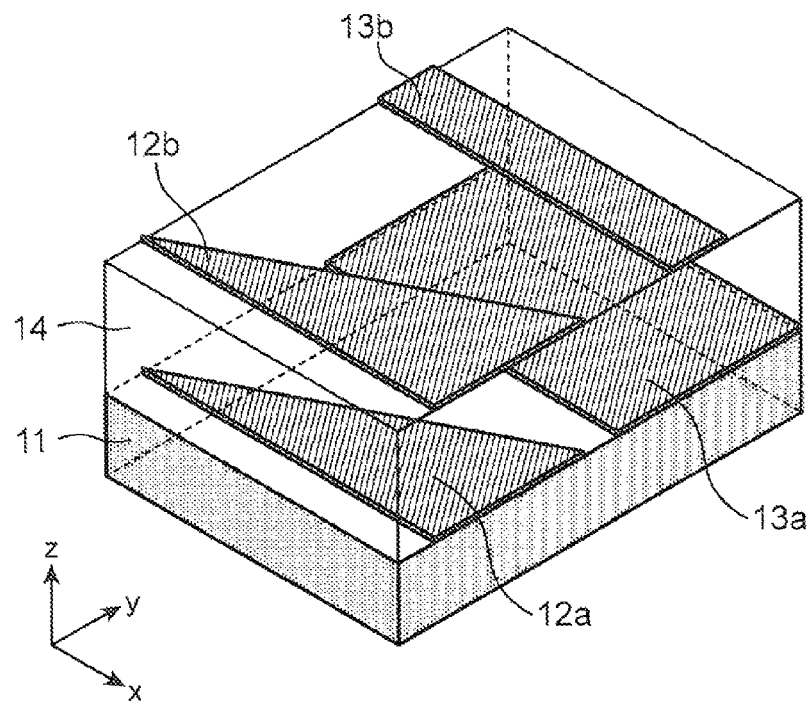
FIG. 9 is a fifth perspective view for describing the manufacturing process of the optical deflection element illustrated in FIG. 1.
Figure 10:
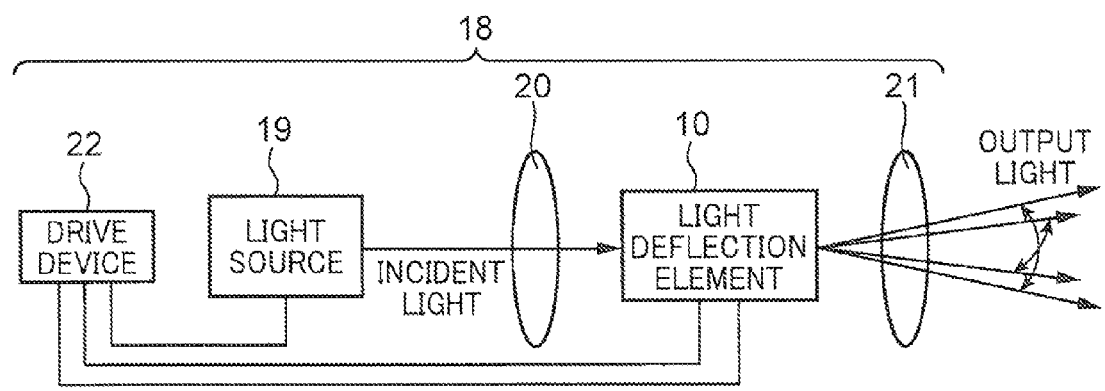
FIG. 10 is a schematic configuration diagram illustrating an example of an optical deflection device incorporated with the optical deflection element illustrated in FIG. 1.

Subsequently, as illustrated in FIG. 9, the triangular first upper electrode 12b identical to the first lower electrode 12a in shape, and the rectangular second upper electrode 13b whose side in y-axis direction is shorter than the corresponding side of the second lower electrode 13a are formed by removing an unwanted portion from the ITO electrode 17 by etching.

[Sixth Step]

Lastly, the incident end surface and the output end surface of the optical deflection element 10 are formed into a smooth surface by polishing. By performing the above steps, the optical deflection element 10 is manufactured.

The optical waveguide film 14, the first electrode pair 12, and the second electrode pair 13 may also be formed by a vapor growth method selected from electron beam vapor deposition, flash vapor deposition, ion plating, laser abrasion, molecular beam epitaxy, CVD (Chemical Vapor Deposition), plasma CVD, MOCVD (Metal Organic Chemical Vapor Deposition), and the like, in addition to sputtering.

Further, other layers such as a protection layer may be formed on the first upper electrode 12b, the second upper electrode 13b, and a portion of the optical waveguide film 14 devoid of the first upper electrode 12b and the second upper electrode 13b.

Next, an optical deflection device incorporated with the optical deflection element illustrated in FIG. 1 is described referring to FIG. 10. An optical deflection device 18 is provided with a light source 19, an incident optical system 20, the optical deflection element 10, an output optical system 21, and the drive device 22.

It is desirable to use a semiconductor laser as the light source 19. The incident optical system 20 guides laser light to be output from the light source 19 to an optical waveguide (the optical waveguide film 14) of the optical deflection element 10. The incident optical system 20 may be desirably configured such that the optical waveguide film 14 and an incident lens in the incident optical system 20 coincide with each other in NA (Numerical Aperture) in order to guide laser light to be output from the light source 19 to the optical deflection element 10 with a high light use efficiency. The output optical system 21 is provided with a lens for collimating laser light output from the optical deflection element 10, and as necessary, a convexoconcave lens for increasing the deflection angle.

The drive device 22 is constituted of a drive circuit for driving the light source 19 and the optical deflection element 10, and a signal generator; and is configured to determine the deflection angle, the driving frequency, and the output light intensity of the optical deflection device 18. Further, the drive device 22 is capable of individually applying a voltage to the first electrode pair 12 and the second electrode pair 13 disposed in the optical deflection element 10. According to this configuration, it is possible to deflect light in a horizontal direction to the surface of the substrate 11, and to deflect light in a direction perpendicular to the surface of the substrate 11 as intended, whereby it is possible to perform two-dimensional deflection as intended.

The optical deflection device 18 is configured such that the drive device 22 drives the light source 19 and the optical deflection element 10. The embodiment is not specifically limited to the above example. One drive device may drive the optical deflection element 10, and another drive device may drive the light source 19. Further, the incident optical system 20 is disposed on the light incident side of the optical deflection element 10, and the output optical system 21 is disposed on the light output side of the optical deflection element 10. The embodiment is not specifically limited to the above example. Either one of the incident optical system and the output optical system may be disposed.

(Second Embodiment)

Figure 11:
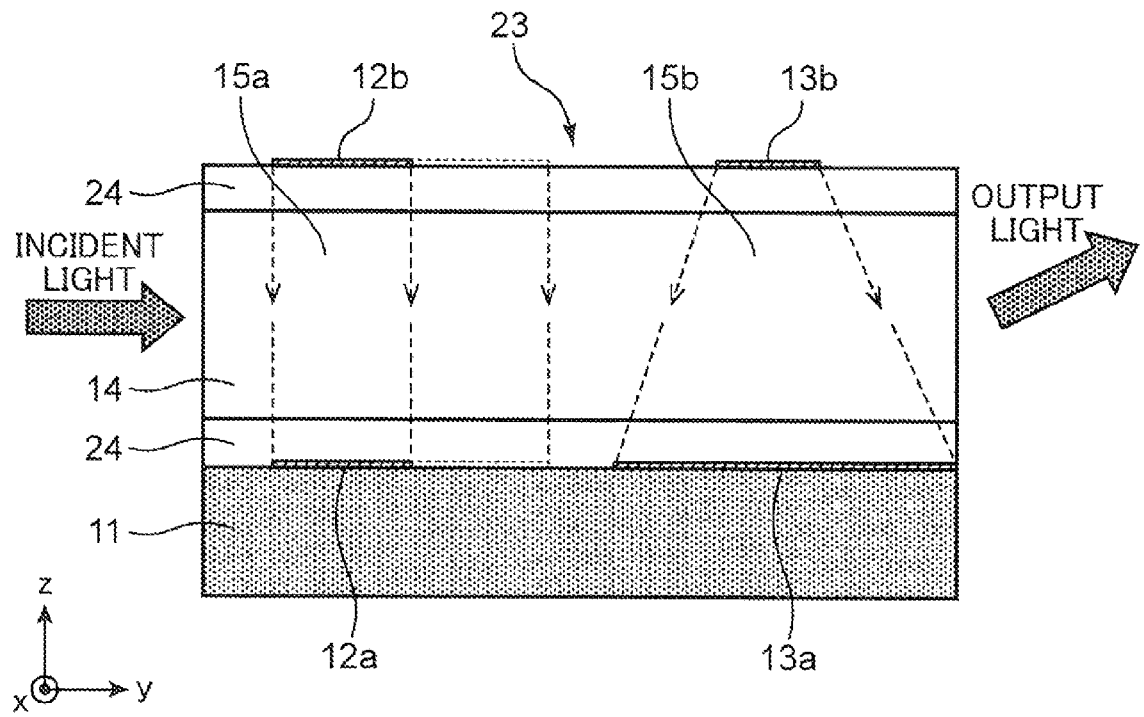
FIG. 11 is a main part cross-sectional view of an optical deflection element according to the second embodiment of the invention.

Next, an optical deflection element in the second embodiment of the invention is described mainly on the point which differs from the optical deflection element in the first embodiment, referring to FIG. 11.

FIG. 11 is a main part cross-sectional view of the optical deflection element according to the second embodiment of the invention. FIG. 11 corresponds to FIG. 2 illustrating a cross section of the optical deflection element 10 in the first embodiment. An optical deflection element 23 in the second embodiment is different from the optical deflection element 10 in the first embodiment in a point that clad layers 24 are formed between an optical waveguide film 14 and a first electrode pair 12, and between the optical waveguide film 14 and a second electrode pair 13.

Specifically, the lower clad layer 24 is disposed on the lower surface of the optical waveguide film 14, and a first lower electrode 12a and a second lower electrode 13a are disposed between the lower clad layer 24 and a substrate 11. Further, the upper clad layer 24 is disposed on the upper surface of the optical waveguide film 14, and a first upper electrode 12b and a second upper electrode 13b are disposed on the upper clad layer 24.

It is possible to form the first electrode pair 12 and the second electrode pair 13, using various metals such as Al, Ti, Cr, Ni, Cu, Pd, Ag, Ta, W, Pt, and Au, or alloys of these metals. In particular, in forming a metal electrode on the optical waveguide film 14, if the number of vibrations of light in the optical waveguide film 14 exceeds the number of plasma oscillations of metal, a component leaked to the metal electrode may be strongly absorbed by carriers in the metal electrode, as light is transmitted. This results in transmission loss.

In view of the above, it is desirable to use a transparent oxide such as ITO or Al-doped ZnO, as a material of the first electrode pair 12 and the second electrode pair 13. Even with use of the above material, leakage of an electromagnetic filed distribution of a light beam transmitting through the optical waveguide film 14 to the electrode may occur. It is often the case the absorption coefficient of an electrode having a practical specific resistance is large, and the leaking component may be strongly absorbed by free carriers in the electrode. As a result, transmission loss in the optical waveguide film 14 may occur due to the absorption into the electrode, in addition to the loss resulting from scattering of light by the optical waveguide film 14 itself. This may lower the light use efficiency.

In view of the above, forming the clad layer 24 between the optical waveguide film 14, and the metal electrode pair (the first electrode pair 12 and the second electrode pair 13) on both surfaces (the upper surface and the lower surface) of the optical waveguide film 14 makes it possible to prevent leakage of an electromagnetic field to the metal electrodes to thereby avoid absorption of transmitted light. Thus, it is possible to suppress transmission loss in the optical waveguide film 14 to thereby enhance the light use efficiency.

As a material of the clad layer 24, it is possible to use a material having a refractive index smaller than the refractive index of the electro-optic medium forming the optical waveguide film 14, and capable of forming the clad layer 24 into an epitaxial film with respect to the material of the substrate 11 and with respect to the material constituting the first lower electrode 12a and the second lower electrode 13a. As a condition capable of retaining the epitaxial relationship, it is desirable that the crystal structure of the material forming the clad layer 24 is analogous to the crystal structure of the material constituting the substrate 11, the first lower electrode 12a, and the second lower electrode 13a, and of the electro-optic medium constituting the optical waveguide film 14, and that the lattice constant difference between the crystal structures is not larger than 10%. However, as far as it is possible to retain the epitaxial relationship by epitaxially growing the clad layer 24 on the substrate 11, the first lower electrode 12a, and the second lower electrode 13a, it is not necessary to follow the relationship.

Specifically, when $ABO_3$ perovskite oxides are used as a material of the clad layer 24, it is possible to use e.g. $SrTiO_3$, $BaTiO_3$, $PbTiO_3$, $KNbO_3$, or $KTaO_3$ as a tetragonal crystal system, an orthorhombic crystal system, or a pseudo cubic crystal system; and to use a material selected from ferroelectrics as represented by $LiNbO_3$ and $LiTaO_3$, as a hexagonal crystal system.

Further, it is preferable to set the ratio (c/d) of the film thickness c of the clad layer 24 with respect to the film thickness d of the optical waveguide film 14 to be not smaller than 0.1, more preferably, not smaller than 0.5, and to set the film thickness c of the clad layer 24 to be not smaller than 10 nm. In the above configuration, it is possible to suppress transmission loss in the optical waveguide film 14 to thereby enhance the light use efficiency.

INDUSTRIAL APPLICABILITY

An optical deflection element and an optical deflection device of the invention enable to realize a small-sized optical deflection element with use of one substrate, and enable to two-dimensionally deflect a light beam at a low drive voltage and at a high speed. Thus, the invention is applicable to the whole range of optical devices including a laser printer, a projector, a laser scanning microscope, an optical diagnostic device using optical coherence tomography, and a switching element for optical communication.

The invention claimed is:

1. An optical deflection element, comprising:
   a substrate;
   an optical waveguide film made of an electro-optic medium, and constituting an optical waveguide formed on the substrate;
   a first electrode pair disposed on an incident side of the optical waveguide film at a position facing a film thickness direction of the optical waveguide film, and configured to deflect a light beam transmitting through the optical waveguide film in an in-plane direction of the optical waveguide film in accordance with a first applied voltage; and
   a second electrode pair disposed on an output side of the optical waveguide film at a position facing the film thickness direction of the optical waveguide film, and configured to deflect the light beam deflected in the in-plane direction of the optical waveguide film by the first electrode pair in the film thickness direction of the optical waveguide film in accordance with a second applied voltage, wherein
   the second electrode pair includes a first electrode and a second electrode, and
   the first electrode and the second electrode are formed to have lengths different from each other in a direction of travel of the light beam transmitting through the optical waveguide film.

2. The optical deflection element according to claim 1, wherein
   a thickness of the optical waveguide film is not smaller than 1 μm but not larger than 10 μm.

3. The optical deflection element according to claim 1, wherein
   the first electrode and the second electrode are metal electrodes.

4. The optical deflection element according to claim 1, wherein
   the first electrode is disposed on a side of the substrate of the optical waveguide film,
   the second electrode is disposed on an opposite side of the substrate of the optical waveguide film, and
   a length of the first electrode in the direction of travel of the light beam transmitting through the optical waveguide film is longer than a length of the second electrode in the direction of travel.

5. The optical deflection element according to claim 1, wherein
   the first electrode is disposed on a side of the substrate of the optical waveguide film,
   the second electrode is disposed on an opposite side of the substrate of the optical waveguide film, and
   a length of the first electrode in the direction of travel of the light beam transmitting through the optical waveguide film is shorter than a length of the second electrode in the direction of travel.

6. The optical deflection element according to claim 1, wherein
   the first electrode is formed into a rectangular shape,
   the second electrode is formed into a rectangular shape having a surface area smaller than a surface area of the rectangular shape of the first electrode, and
   the first electrode and the second electrode form a quadrangular prism in an area of the optical waveguide film sandwiched between the first electrode and the second electrode by application of the second applied voltage, the quadrangular prism having a trapezoidal shape in cross section along the direction of travel of the light beam transmitting through the optical waveguide film.

7. The optical deflection element according to claim 6, wherein
the first electrode is disposed on a side of the substrate of the optical waveguide film, and
the second electrode is disposed on an opposite side of the substrate of the optical waveguide film.

8. The optical deflection element according to claim 6, wherein
the second electrode is disposed to face a middle area of the first electrode in the direction of travel of the light beam transmitting through the optical waveguide film.

9. The optical deflection element according to claim 1, wherein
a refractive index of a prism area of the optical waveguide film sandwiched between the first electrode pair is changed by application of the first applied voltage to the first electrode pair, and
a refractive index of a prism area of the optical waveguide film sandwiched between the second electrode pair is changed by application of the second applied voltage to the second electrode pair.

10. The optical deflection element according to claim 1, wherein
the first electrode pair is formed such that the electrode pair has a triangular shape identical to each other, and
the first electrode pair forms a triangular prism in an area of the optical waveguide film sandwiched between the first electrode pair by application of the first applied voltage.

11. The optical deflection element according to claim 1, wherein
the first electrode and the second electrode form a prism area in an area of the optical waveguide film sandwiched between the first electrode and the second electrode by application of the second applied voltage, the prism area having a refractive index different from a refractive index of the optical waveguide film before application of the second applied voltage,
the prism area includes a first boundary surface and a second boundary surface serving as a boundary between a portion of the optical waveguide film devoid of the prism area, and the prism area,
the first boundary surface and the second boundary surface are inclined with respect to the film thickness direction of the optical waveguide film, and
a light beam to be incident on the prism area is deflected in the film thickness direction of the optical waveguide film on the first boundary surface, and is deflected in the film thickness direction of the optical waveguide film on the second boundary surface.

12. The optical deflection element according to claim 1, wherein
the substrate has a refractive index smaller than a refractive index of the optical waveguide film.

13. The optical deflection element according to claim 1, wherein
each of the first electrode pair and the second electrode pair has a refractive index smaller than a refractive index of the optical waveguide film.

14. The optical deflection element according to claim 1, wherein
each of the first electrode pair and the second electrode pair is a plurality of pairs of electrodes.

15. The optical deflection element according to claim 1, further comprising:
a clad layer formed between the optical waveguide film and the first electrode pair, and between the optical waveguide film and the second electrode pair.

16. The optical deflection element according to claim 1, wherein
the electro-optic medium forming the optical waveguide film has a composition represented by $KTa_{1-x}Nb_xO_3$ (where x is $0<x<1$).

17. An optical deflection device, comprising:
a light source;
the optical deflection element of claim 1 which deflects light incident from the light source;
an optical system provided on at least one of the light incident side and the light output side of the optical deflection element; and
a drive device which applies the first applied voltage and the second applied voltage to the optical deflection element for driving the optical deflection element.

* * * * *